Dec. 23, 1941. N. H. MAGEOCH ET AL 2,267,116
VALVE CONTROL
Filed April 10, 1941  5 Sheets-Sheet 3
FIG. 3.
FIG. 4.
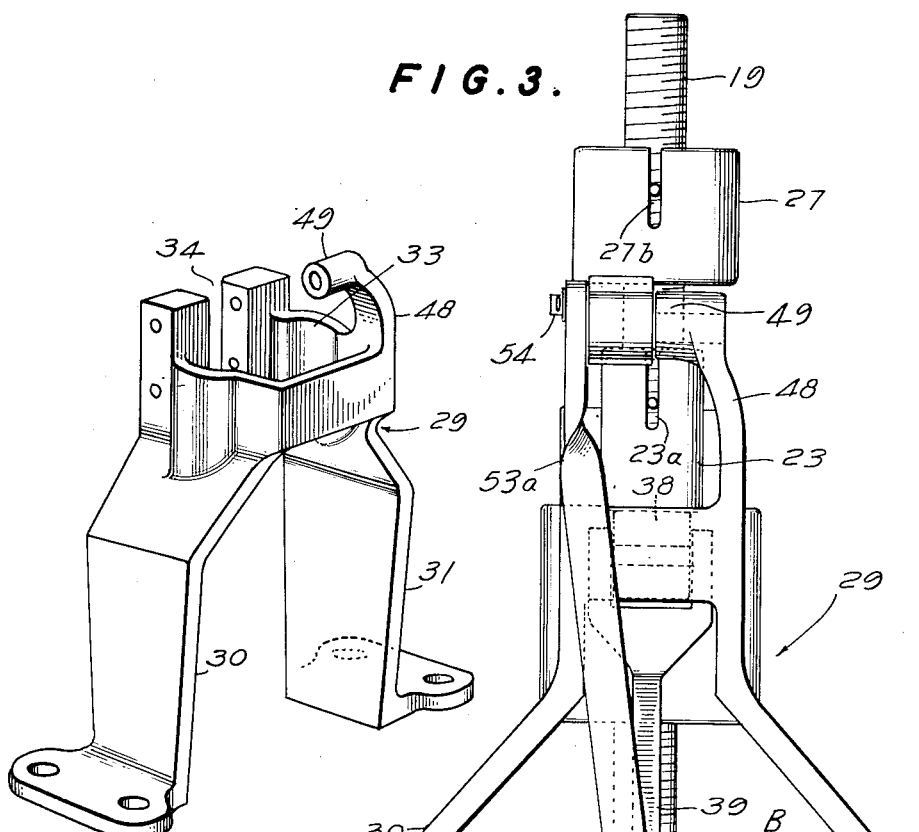
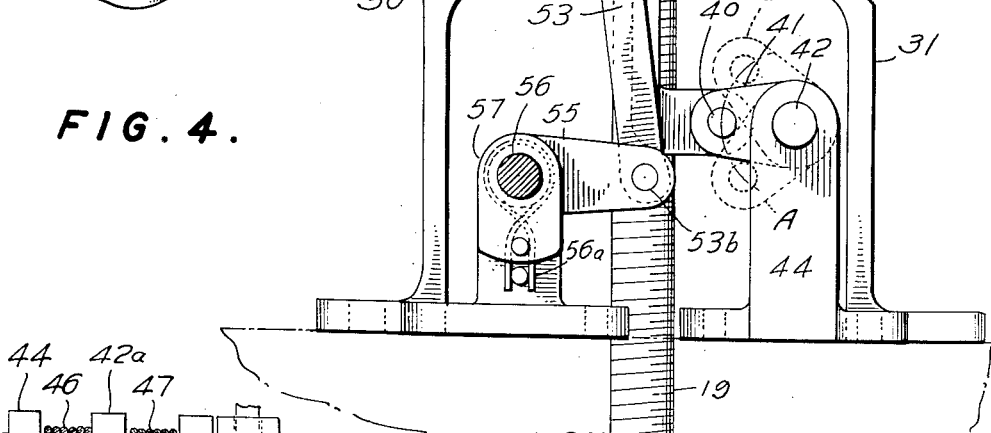
FIG. 5.
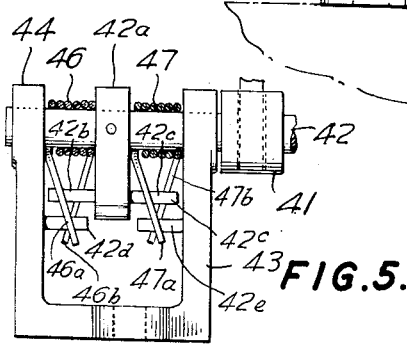
INVENTORS
NELSON H. MAGEOCH
WILLIAM F. PLUME
BY Arthur Middleton
ATTORNEY.

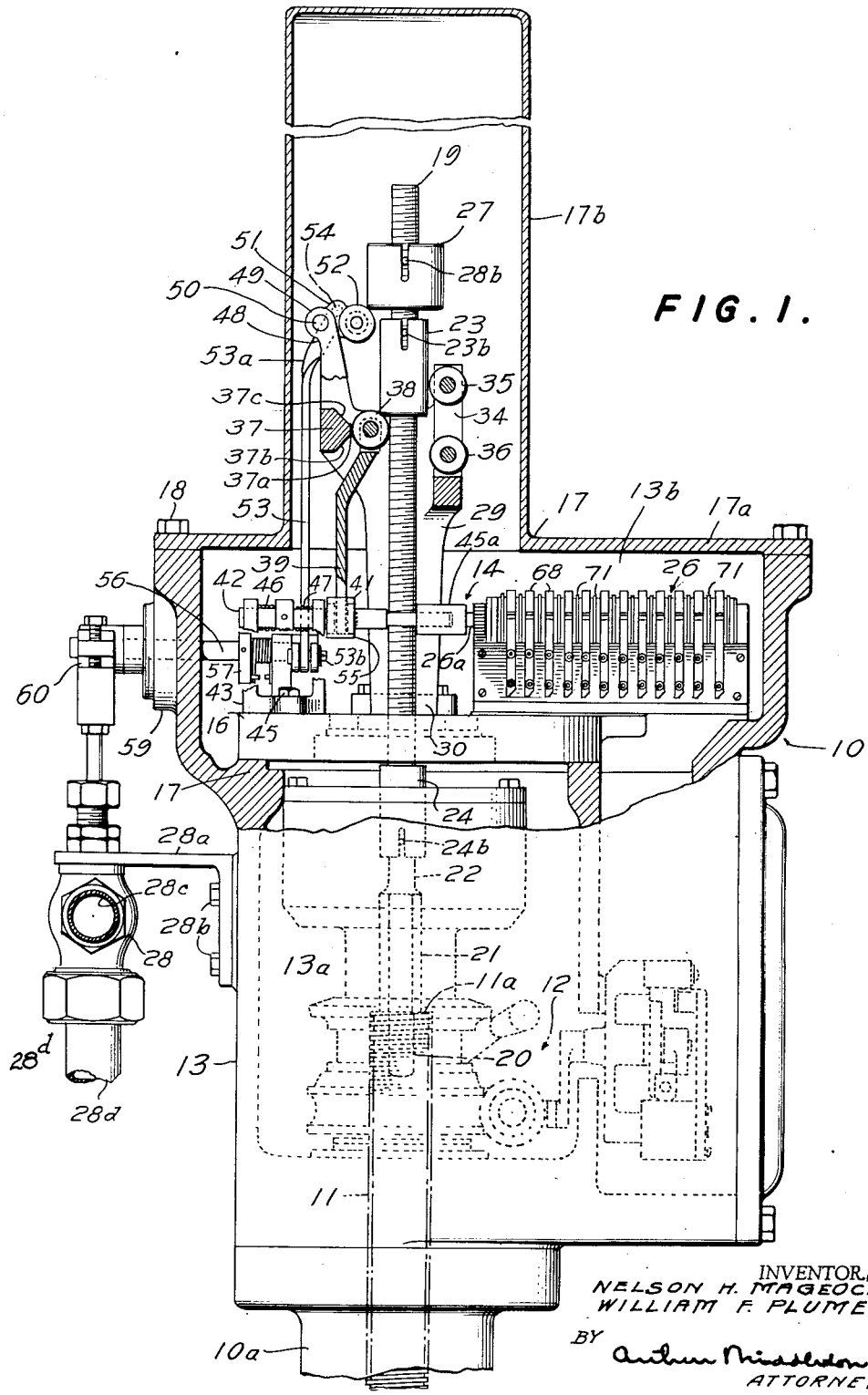

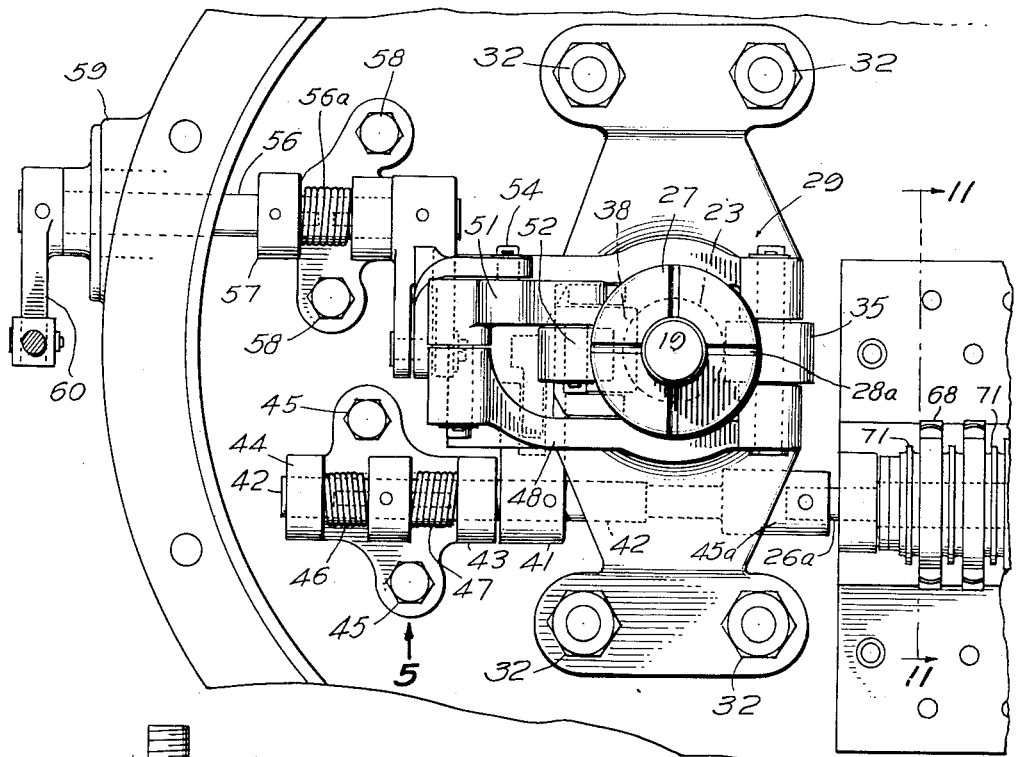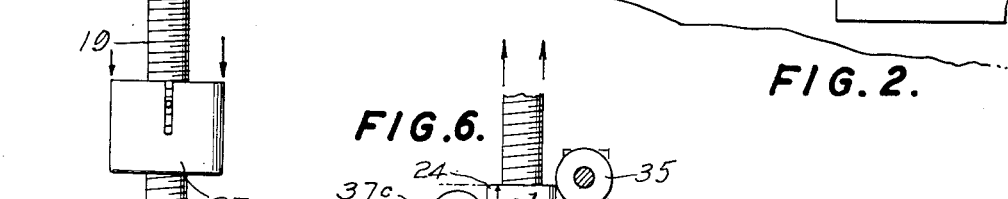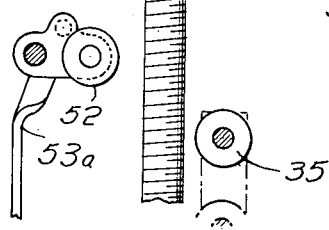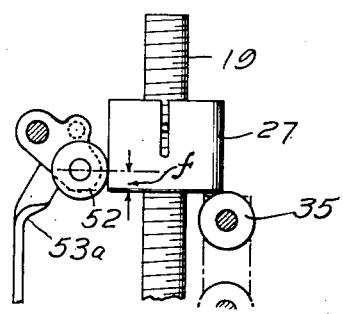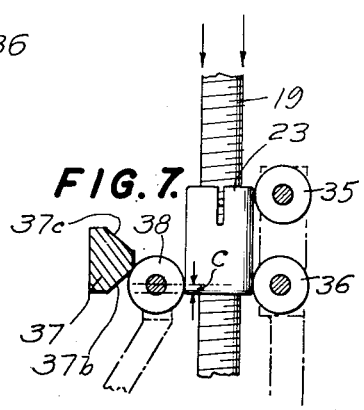

Dec. 23, 1941.                N. H. MAGEOCH ET AL                2,267,116
                                  VALVE CONTROL
                              Filed April 10, 1941         5 Sheets-Sheet 4

INVENTORS
NELSON H. MAGEOCH
WILLIAM F. PLUME
BY
ATTORNEY

INVENTORS
NELSON H. MAGEOCH
WILLIAM F. PLUME
BY
Arthur Middleton
ATTORNEY.

UNITED STATES PATENT OFFICE 2,267,116

VALVE CONTROL

Nelson H. Mageoch, Manoa, Pa., and William F. Plume, Audubon, N. J., assignors to Philadelphia Gear Works Inc., Philadelphia, Pa., a corporation of Pennsylvania Application April 10, 1941, Serial No. 387,882

7 Claims. (Cl. 200—47)

This invention relates to power operated valves, and valve systems, the operation of which is partly or wholly automatically controlled. More specifically, this relates to valve operating means or valve actuators, or means whereby there is effected the automatic actuation of the valve itself, or of apparatus or devices operatively associated with it. This invention contemplates deriving required control impulses from the linear movement of the valve stem.

Consequently, the operation of apparatus herein contemplated may comprise not only the automatic stoppage of the valve stem in its open and closed positions, as effected by the various types and constructions of limit switches, but also the coordinated control of a set of valves required to cooperate with one another in a certain order, or of a valve or valves required to operate in conjunction with other operative component parts of a system.

Operating conditions herein mainly considered, require sharp timing of operating or conditioning impulses in relation to the travel of the valve stem. The points of timing may be required to fall within the period of the actual movement of the valve stem. Furthermore, allowance must be made for the drifting of the drive motor after it has been shut off, that is where the motor power is shut off somewhat before the closing operation of the valve stem is completed, rather than coincident with the open or closed limit position of the valve stem. For the purpose of this invention, we term as over-travel that portion of the opening or closing movement of the valve stem, which is performed from the point of giving the control impulse to de-energize the motor to the point at which the valve stem comes to rest.

For example, in some valve systems, as in oil refineries, the valves in question are required to open or close periodically at precise time intervals, and in carefully timed relationship or sequence with one another. A valve operator system for this purpose has been known to be controlled by a master control device including for instance the control by electrical inter-locking means plus associated condition indicating means.

It may further be desired in oil refinery operation to control the operation of an auxiliary steam valve through the closing movement of the valve, for the purpose of admitting steam into the bonnet of the valve. Such operating control for example is intended to be included in the control mechanism according to this invention.

One object of this invention is to provide means whereby control effects coupled with the movement of the valve stem are obtained in a positive and accurate manner.

Another object is to improve plant operation by way of improving the accuracy in the timing of the valve operating control as in the case of oil refinery operation.

Heretofore such control effects were realized by means of what may be called a multi-contact finger switch. According to previous practice this switch was structurally associated with the valve in such a manner that the operation of the valve would cause the opening of various electric circuits and the completion of others. The function of this finger switch depended purely upon the deflection of contact fingers. The amount of deflection of the fingers caused by the operation of the valve actuating mechanism, was a measure of the amount of over-travel of the valve stem. Hence the timing of the automatic valve actuator depended upon the deformation imposed upon the contact fingers with the result that an accurate control was difficult or impossible of attainment.

This inaccuracy was aggravated or multiplied in the construction of a finger switch in which both contact fingers of a pair of contacts are deflected, and each pair of contact fingers in turn is actuated by the preceding pair, so that adjusted variations in the timing of circuits as represented by respective contacts could not, or at least not accurately, be obtained.

Still other difficulties lay in the fact that foreign matter lodged between the contacts or corrosion of the contact material interfered, and that maintenance difficulties were encountered in keeping the contacts properly aligned, due to the interdependence of the contact fingers. The clearance between contacts when open, is small, and must be small if excessive deflection of the contact fingers is to be avoided. Hence a change in the deformation or deformability as through thermal or other influences of the contact fingers is liable to affect the contact clearance and disturb the proper timing of the operating control, and thereby upset the type of coordinated operation intended as in a valve system where the valves must work inter-dependently.

In order to overcome these difficulties and to attain the objects of positive and adjustable operation there is provided according to the invention a rotary switch motion or rotary drum switch whereby the timing is rendered positive.

A cam controlled actuating mechanism according to the invention operates the rotary switch, and it is capable of absorbing a predetermined and adjusted amount of over-travel by a reason of a cam-shaped nut which is adjustably movable along a threaded extension rod extending from the top end of the valve stem.

According to one feature the cam-actuated mechanism and the rotary switch associated therewith are mounted on top of the housing that surrounds the valve drive mechanism, the housing in turn being mounted on the valve yoke.

According to another feature, the accuracy of adjustment of the timing is further increased by assembling annular contact elements of the rotary switch upon a shaft or drum element by means of relatively fine toothed interengagement between the contact elements and the shaft. A fixed although adjusted angular relationship between the various annular contact elements can thus be securely established, whereby there can be maintained an accurately timed sequence of contact operations, and which relationship once adjusted cannot readily be disturbed.

Still another feature provides for a similar cam controlled operation of the auxiliary steam valve.

The invention possesses other subjects and features of advantage, some of which, with the foregoing, will be set forth in the following description. In the following description and in the claims, parts will be identified by specific names for convenience, but they are intended to be as generic in their application to similar parts as the art will permit. In the accompanying drawings there has been illustrated the best embodiment of the invention known to us, but such embodiment is to be regarded as typical only of many possible embodiments, and the invention is not to be limited thereto.

The novel features considered characteristic of our invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 1 is a part sectional side view of the valve operator, showing a switch actuating extension or control rod extending from the valve stem.

Fig. 2 is an enlarged plan view of the valve actuator with the top cover portion removed.

Fig. 3 is a side view of the auxiliary yoke construction and of the cam actuated parts embodied in Figs. 1 and 2.

Fig. 4 is a perspective view of the auxiliary yoke construction.

Fig. 5 is a detailed side view taken on Fig. 2 of a spring arrangement for maintaining the neutral position of a corresponding cam roller when the latter is idle.

Figs. 6, 7, 8 and 9 are detailed operating views showing various operating positions of the cam roller and cam nuts.

Figure 10:
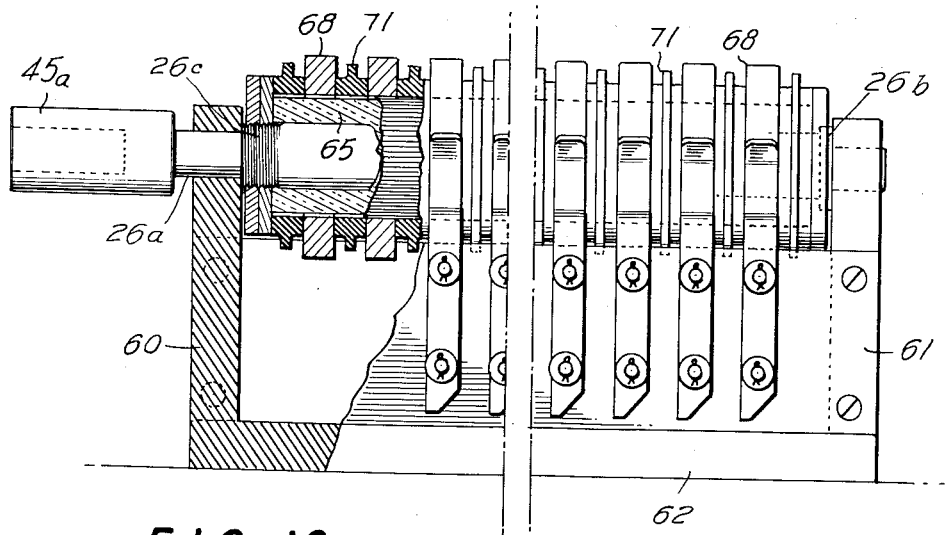
Fig. 10 is a part sectional side view of the rotary drum switch.

The valve actuator collectively designated by the numeral 10 is mounted upon a valve yoke 10a fixed upon the valve bonnet 10b which in turn is fastened to the valve body 10c. A valve stem 11 operates in the yoke, and has an upper end face 11a. For the purpose of opening and closing the valve, the stem 11 performs axial up and down movement by reason of an actuating mechanism 12 contained in a portion or chamber 13a of a housing 13. The mechanism comprises an actuating nut the rotation of which effects axial movement of the stem 11, and a power actuated worm drive for rotating the nut. This mechanism is herein indicated, and, by way of example, shown to be substantially similar to the one disclosed in the patent to Ball, No. 2,222,699, and a specific description thereof may herein be omitted.

Besides the lower chamber 13a for the actuating mechanism, the housing 13 further comprises an upper chamber 13b to house the cam actuated control mechanism hereinafter to be described. A horizontally extending partition between the two chambers 13a and 13b is represented by a cover plate 16 bolted to an inner shoulder 17 forming part of the housing 13. The upper chamber 13b, comprises a cover 17 fastened to the walls of the chamber 13b as by bolts 18, and shown to consist of a horizontal plate portion 17a and a cylindrical portion 17b.

The control desired to be effected by the device according to this invention is derived from the axial movement of the valve stem 11, that is to say, by way of an upward axial extension thereof, represented by a threaded rod 19. This rod has a lower end constituting a threaded portion 20 whereby it is screwed axially into the upper end of the spindle 11, and it has a shoulder portion 21 which is thus tightened against the end face 11a of the spindle 11. Upwardly from the shoulder portion 21 extends the threaded portion 22 upon which engage what are herein called an upper limit cam nut 23 and a lower limit cam nut 24, which cam nuts are to actuate, and to establish the limit positions in rotary drum switch 26 hereafter to be described. The threaded rod 19 carries a further cam nut 27 shown to be larger in diameter than the first mentioned nuts 23 and 24, to actuate an auxiliary steam valve 28 which is mounted upon the casing 13 by means of a bracket 28a fastened to the casing by screws 28b intended to automatically admit steam pressure into the valve bonnet 10b at the closing of the valve. The exact positioning of the cam nuts on the threaded rod 19 is important, and their adjustment in this example is made possible with an accuracy of quarter turns of the cam nuts due to the provision of cross-wise incisions or deep-cut notches 23a, 24a, and 28a respectively, engaged by respective cotter pins 23b, 24b and 28b extending through the threaded rod 19 (see also Fig. 1). Steam enters the valve 28 through pipe 28c and from the valve 28 passes through a pipe 28d into the valve bonnet. It will be seen that the position of each cam nut can thus be adjusted along the threaded rod 19 by degrees corresponding to a quarter turn of the cam nut and through a range along the threaded rod, which corresponds to the depth of the incisions or notches provided in the cam nuts.

The cam actuated mechanism in the upper chamber 13b further comprises a bracket or auxiliary yoke 29 more clearly shown in Figs. 3 and 4. This bracket has a pair of leg portions 30 and 31 whereby it is fastened to the cover plate 16 as by bolts 32, and the legs 30 and 31 are connected with one another at the top by a body portion or crown portion 33 through which extends the threaded rod 19. The crown portion 33 has on the side thereof a recess 34 in which is mounted a pair of guide rollers 35 and 36, rotating about a horizontal axis and disposed one above the other. Opposite these rollers the crown portion 33 has an inwardly projecting hump or detent portion 37 shaped to form inwardly pointing peak 37a, a lower bevel face 37b extending from the peak downwardly and outwardly, and an upper bevel face 37c extending from the peak upwardly and outwardly. The detent portion 37 cooperates with the guide rollers 35 and 36 by co-action with the cam nuts 23 and 24, respectively. A cam roller 38 is mounted at the free end of an actuating rod 39, the opposite end of which is pivotally connected as at 40 with an arm 41 fixed to a horizontally extending shaft 42, which in turn is mounted in a pair of bearing lugs 43 and 44 of a bracket member fastened as by bolts 45 to cover plate 16. Shaft 42 is disposed coaxially with the rotary drum switch 26 and connected with the shaft 26a thereof by means of a coupling 45a. Unless otherwise influenced, the shaft 42 with its arm 41 and consequently the rotary switch 26, are in a neutral position resiliently maintained by a pair of coil springs 46 and 47.

The arrangement and function of the coil springs 46 and 47 is more clearly shown in a side view thereof in Fig. 5. Fixed on the shaft 42 is an arm 42a from which in turn extend in opposite directions a pair of studs 42b and 42c. The stud 42b has a stud 42d corresponding to it extending from the bearing lug 44, while to the stud 42c corresponds a stud 42e extending from the bearing lug 43. The coil spring 46 has terminal portions 46a and 46b which straddle and grip the studs 42b and 42d, while the coil spring 47 has terminal portions 47a and 47b which straddle and grip the studs 42c and 42e.

It will then be clear that the springs 46 and 47 will jointly tend to hold the arm 41 in the full line or neutral position shown in Fig. 3, unless otherwise influenced against the resistance of the springs 46 and 47. As the arm 41 is moved to the dotted line position A, it is so moved against the pressure of the springs 46 and 47, as the studs 42b and 42c force the terminal portions 46a and 47a away from the terminals 46b and 47b which latter are held back by the fixed studs 42d and 42e. Similarly, as the arm 41 is moved to the dotted line position B, it is so moved against the pressure of the springs 46 and 47, with the terminal portions 46b and 47b being forced away by the studs 42b and 42c from the terminal portions 46a and 47a, which latter are held back by the fixed studs 42d and 42e.

The neutral position of the switch 26 corresponds to the position of parts shown in Fig. 1, with the cam roller 38 consequently being positioned at the peak 37a of the detent portion 37. However, when the upper cam nut 23 moves downwardly during the closing of the valve, and incidentally from its Fig. 1 position to its Fig. 7 position, the cam nut 23 will force the cam roller 38 from its position at the peak 37a against the pressure of springs 46 and 47, on to the lower bevel face 37b of the detent portion 37, thus rotating the switch 26 to its one limit position which corresponds to the position A of arm 41 (see Fig. 3), and thus simultaneously locking the switch in this position while the cam nut 23 may be allowed to override the cam roller 38 to whatever extent is desirable and provided for by the setting or adjustment of the cam nut 23 upon the threaded rod 19. Correspondingly, when the lower cam nut 24 moves upwardly during the opening of the valve, it forces the cam roller 38 against the pressure of spring 46 from its neutral position at the peak 37a of the detent portion 37 on to the upper bevel face 37c thereof, thereby rotating the switch 26 to, and locking it in its opposite limit position as indicated by the position B of the arm 41.

The crown portion 33 of the auxiliary yoke 29 is furthermore provided with a bracket portion 48 having an eye 49 disposed above the detent portion 37, and having mounted in it a pin or pivot 50 for operatively supporting cam controlled elements to actuate the auxiliary steam valve 28. That is to say, the pivot 50 carries a swingable arm 51, the free end of which in turn carries a cam roller 52 adapted to be engaged by the cam nut 27. The upper end of a vertical link member 53 having in it a ninety degree twist 53a which is pivotally connected with the arm 51 at a point 54 which is intermediate the cam roller 52 and the pivotal axis of the arm 50. The lower end of the link member 53 is pivotally connected as at 53b with the free end of an arm 55, which in turn is fixed to a shaft 56 encircled and engaged by a coil spring 56a, and rotatable in a bearing lug 57 fixed to the cover plate 16 as by bolts 58, and also journalled as at 59 in the wall of the upper chamber 13b of the housing 13. Consequently, one end of the shaft 56 extends through and outwardly of the wall of chamber 13b, which outer shaft end has fixed thereto an arm 60 having a suitable positive operating connection with the auxiliary steam valve 28 to actuate the same by rotation of the shaft 56.

Figure 11:
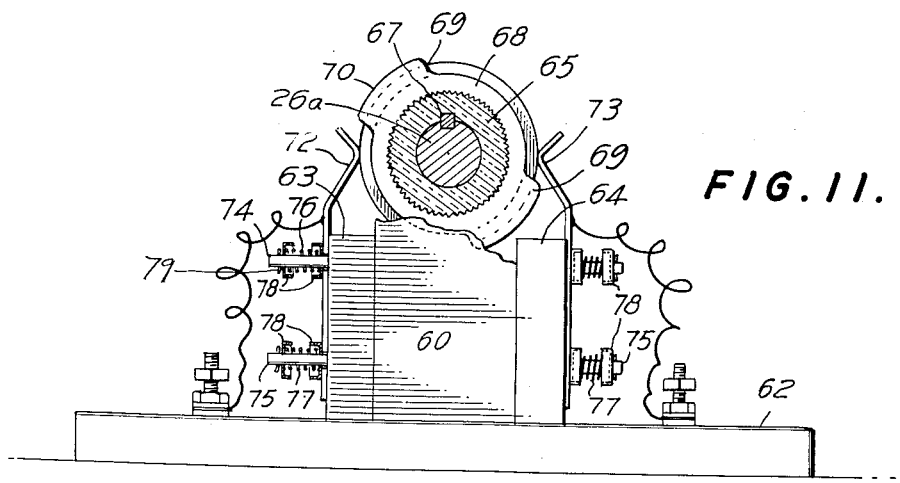
Fig. 11 is a part sectional end view of the rotary drum switch of Fig. 10.
Figure 12:
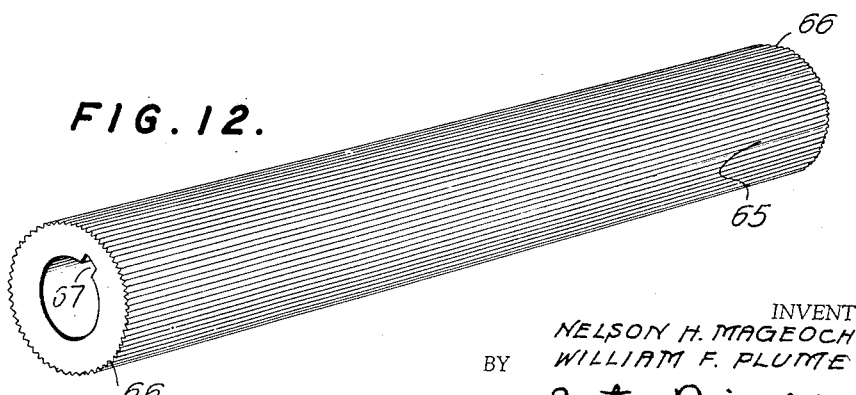
Fig. 12 is a perspective detailed view of the insulating drum member of the rotary switch, showing the riffled toothed surface thereof.
Figure 13:
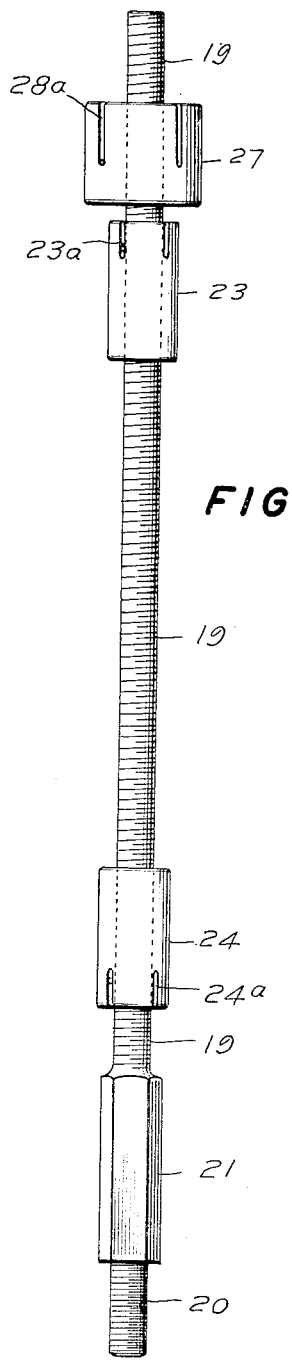
Fig. 13 is a detailed view of the extension or control rod of the switch actuating extension or control rod shown in Figs. 1 and 3.

The rotary drum switch 26 (see Figs. 10, 11, 12), comprises the shaft 26a, one end of which is provided with a collar 26b, and the other end of which has a thread 26c. The shaft 26a is journalled in end plates 60 and 61 of the bracket, rising from a base plate 62 attached to the cover plate 16. At their sides, the end plates 60 and 61, are interconnected by connecting plates 63 and 64. The base plate 62 as well as the connecting plates 63 and 64 serve for the mounting of the terminals for the switch contacts as will be seen.

Fitted over the shaft 26a is a drum or tubular member 65 consisting of a suitable insulating material, and circumferentially provided with teeth 66, the width of which is equal to the length of the member 65. Sixty teeth provided over the circumference have been found to be a suitable number for the present purpose. The member 65 furthermore has a groove 67 or the like whereby it is adapted to engage a tooth or key on the shaft 26a so as to provide a non-slipping connection between the member 65 and the shaft 26a.

The member 65 carries a series of contact rings 68, the number of which depends upon the number of circuits provided for in a particular operating system. Each contact ring 68 is interiorly provided with teeth that are complementary to and designed to engage those on the member 65. That is to say, that the provision of sixty teeth 66 permits the contact ring to be angularly adjusted with respect to the member 65 by one-sixtieth of the circumference, and in this way the various contact rings 68 may be given an accurate position in the assembly of the switch, corresponding to the system of timing of the various circuits or electrical impulses that underlie the proper functioning of the particular operating system involved.

The contact rings 68 have outwardly projecting contact portions 69 presenting the contact faces 70 proper. Spacer rings 71 of insulating or non-conductive material are provided in alternation with the contact rings 68. Each contact ring 68 cooperates with a pair of relatively stiff contact fingers 72 and 73, which fingers are resiliently mounted upon the connecting plates 63 and 64 respectively. Describing for example the mounting of the contact finger 72 (see Fig. 11), it will be noted that the finger is vertically positioned for engagement with a contact face 70 of a contact ring, by means of a pair of pins 74 and 75, which are fixed in the connecting plate 63, and upon which the finger 72 is loosely seated. The finger 72 is held resiliently against the connecting plate 63 by means of a pair of coil springs 76 and 77, each of which is confined between a pair of discs 78, the outer ones of these discs being held on their respective pins 74 and 75 by means of cotter pins 79. It will be seen that the finger 72 (as well as all the other fingers), is so arranged that the contact face 70 forces the finger 72 away and against the pressure of the springs 76 and 77, which springs in turn furnish a desired and substantially constant pressure between the finger and its corresponding contact face 70 on the contact ring 68.

The operation of this power driven valve actuator is represented by an operating cycle, including the valve opening and valve closing operations, as follows:

Let it be assumed that the valve is in the process of opening. During the major portion of such valve opening movement of the stem, substantially none of the cam nuts 23, 24, 27, are engaged with any of the respective cam rollers, 38, 52, 35 and 36. At this time the switch arm 41 is being resiliently held in its full line position (see Fig. 3), by the springs 46 and 47, which in turn holds the cam roller 38 in the position (see Fig. 1) at the peak 37a of the hump 37. As the valve approaches its open end position, the cam nut 24 engages the cam roller 38, forcing it up on to the bevel face 37c and against the pressure of spring 46, while the cam nut is being backed by the guide rollers 35 and 36. This position is shown in Fig. 6 and it actuates the switch 26, determining the position B (see Fig. 3) thereof. Thus, as soon as the cam roller 38 mounts on to the cam nut 24, and with the contact rings 68 and the contact faces 70 properly arranged, the rotary switch 26 will shut off the driving power of a motor (not shown), which actuates the driving mechanism 12.

However, the momentum of the driving parts and of the motor armature, even after the power is shut off, may carry the valve spindle further up a distance until such momentum is consumed. Continued movement after switch actuation is herein called over-travel of the valve stem, and in the instance of Fig. 6, this over-travel is represented by the distance $d$ that the cam roller 38 has moved relatively along the outer cam face of the cam nut 24. At this point the upwardly moving valve stem comes to rest.

Thereafter, the motor power may be started again to drive the mechanism 12 in the opposite direction, causing the valve stem to move downwardly, to close the valve. As the valve approaches its position on the valve seat, the cam nut 23 will force the cam roller 38 downwardly on to the bevel face 37b, and as the cam roller rides up on to the outer cam face of the cam nut 23, it will thereby set the switch 26 by shifting the switch arm 41 thereof into position A (see Fig. 3). This will shut off the motor power. The cam nut 23 may have been set in such a manner on the threaded rod 19, that it will shut off the motor power a trifle ahead of the actual seating of the valve, thus allowing for a small amount of over-travel represented by the distance $e$ which the cam roller rides relatively along the outer cam face of the cam nut 23. This insures proper seating of the valve by permitting excess momentum to be consumed without undue increase of the valve seating pressure.

It is also possible to utilize the downward switch-actuating movement of the cam roller 38 for some control impulse other than power cut-off at the end of the valve closing movement, and to use it for the purpose of interlocking. In such instance the power cut-off at the end of the valve closing operation may be effected by torque responsive means such as the sliding worm mechanism as described in the patent to Ball, No. 2,114,013, where the driving reaction after the valve has seated or has incurred some obstacle will cause axial movement of the driving worm sufficient to actuate a power cut-off switch to stop the motor. Such a driving worm and a switch mechanism actuated thereby, are indicated at 12a and 12b respectively in Fig. 1.

Substantially at the time of valve seating, that is to say, a trifle ahead of the valve seating point proper, the auxiliary steam valve 28 is to be opened to admit sealing steam into the valve bonnet 10b. This is effected by cam nut 27 which engages the cam roller 52, swinging the arm 54 about pivot 50 for pulling the link 53, which rotates shaft 56 against the pressure of spring 56a and opens auxiliary steam valve 28. Again, there is provided for what in this instance may also be called over-travel, in that the auxiliary steam valve 28 is opened ahead of the final valve seating point, the amount of advance opening being represented by the distance $f$ (see Fig. 9). In Fig. 8 it will be noticed that the threaded rod 19 is moving downwardly with the nut 27 approaching its cam roller 52, while in Fig. 9 the threaded rod 19 has reached its lower rest position, and the cam roller 52 has ridden up relatively and along the outer cam face of the cam nut 27 the distance $f$ corresponding to a predetermined amount of over-travel.

The present arrangement whereby a rotary switch is controlled by the operation of the cam nuts and the cam rollers, permits closely timed coordination of the valve opening and closing circuits with other controlled or operation indicating circuits, such as opening and closing light circuits, and interlocking circuits whereby the operation of the present valve is somehow correlated with another valve of valves of a valve system. The precise timing of various such circuits is established by the proper setting of the cam nuts on the threaded rod 19, as well as by the adjusted setting of the respective contact rings 68 on the insulator drum 65, such setting being determined by way of the inter-engagement of the teeth on the drum 65 with the teeth on the contact rings 68. The adjusted angular relationship of the contact rings 68 with one another determines the timing of the respective circuits with one another, while the superimposed control by the cam nuts and cam rollers in turn correlates or times the operation of these circuits with the terminal points of the movement of the valve stem.

Figure 14:
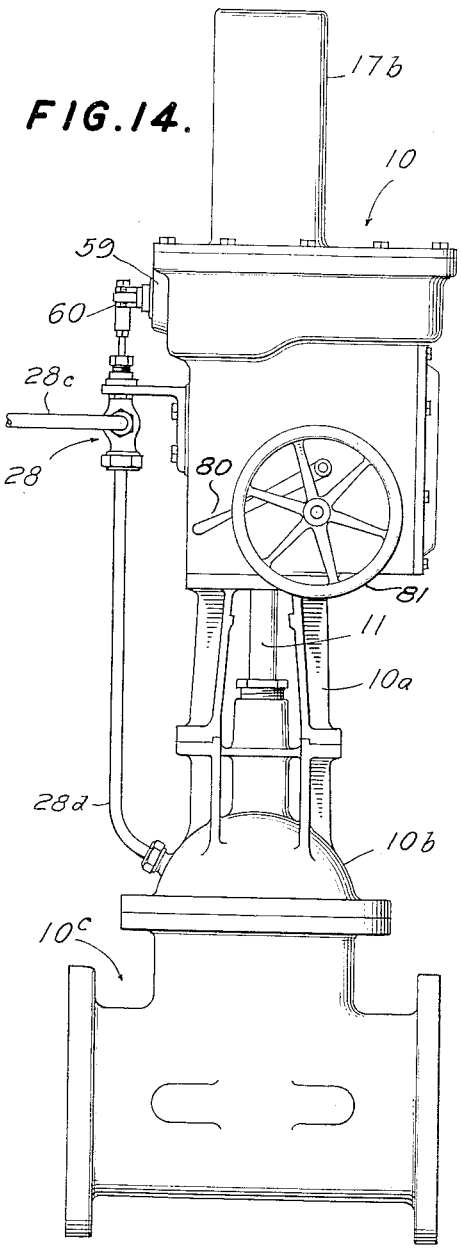
Fig. 14 is a total side view of the valve and valve operator.

A clutch lever 80 (see Fig. 14) may be actuated when it is desired to disconnect the power drive, in order to manually operate the valve as by means of a hand wheel 81.

We claim:

1. In combination with a valve body having a valve stem, power actuating mechanism for effecting axial opening and closing movement of the stem, and means for supporting said actuating mechanism upon said valve body, electric control mechanism actuated by the stem, and comprising an axial threaded extension rod extending from the end of the stem, a cam nut adjustable upon said rod, a turnable drum switch for effecting the electric control, a cam roller cooperatively associated with said cam nut, and a positively actuating crank connection between said cam roller and said switch effective incident to the axial movement of said stem to cause a predetermined degree of turning movement of said switch due to the engagement of said cam roller by said cam nut.

2. In combination with a valve body having a valve stem, power actuating mechanism for effecting axial opening and closing movements of the stem, and means for supporting said actuating mechanism upon said valve body, electric control mechanism actuated by the stem and comprising a threaded axial extension rod extending from the stem, an upper cam nut adjustable upon said rod, a lower cam nut adjustable upon said rod, a turnable drum switch for effecting the electric control, a cam roller operable in one direction by said upper cam nut incident to the closing movement of the valve, and operable in the opposite direction by said lower cam nut, and a positively actuating connection between said roller and said rotary drum switch being effective incident to axial movement of said stem and due to the engagement of said cam roller by said cam nut to cause a predetermined degree of turning movement from neutral position in the one or the other direction of said switch.

3. In combination with a valve body having a valve stem, power actuating mechanism for effecting axial opening and closing movements of the stem, and means for supporting said actuating mechanism upon said valve body, electric control mechanism actuated by the stem and comprising a threaded axial extension rod extending from the stem, an upper cam nut adjustable upon said rod, a lower cam nut adjustable upon said rod, a turnable drum switch for effecting the electrical control, a cam roller operable in one direction by said upper cam nut incident to the closing movements of the valve and operable in the opposite direction by said lower cam nut, and a positively actuating connection between said cam roller and said rotary drum switch, being effective incident to axial movement of said stem and due to the engagement of said cam roller by said cam nut, to cause a predetermined degree of turning movement from neutral position in the one or the other direction of said switch, said actuating connection comprising a movement-transmitting member whose lower end is operatively connected with said switch and whose upper free end carries the roller, and a detent-and locking member for said roller supported by said valve body and provided with a laterally extending peak at which the roller is disposed when the switch is in neutral position, and also provided with a detent face extending downwardly and outwardly from the peak and adapted to be engaged by said roller when the latter is engaged by the upper cam nut incident to the closing of the valve, and further provided with a face extending upwardly and outwardly from said peak and adapted to be engaged by said cam roller when the latter is engaged by the lower nut incident to the opening of the valve.

4. In combination with a valve body having a valve stem, power actuating mechanism for effecting axial opening and closing movements of the stem, and means for supporting said actuating mechanism upon said valve body, electric control mechanism actuated by the stem and comprising a threaded axial extension rod extending from the stem, an upper cam nut adjustable upon said rod, a lower cam nut adjustable upon said rod, a turnable drum switch for effecting the electrical control, a cam roller operable in one direction by said upper cam nut incident to the closing movement of the valve and operable in the opposite direction by said lower cam nut, and a positively actuating connection between said cam roller and said rotary drum switch being effective incident to axial movement of said stem and due to the engagement of said cam roller by said cam nut, to cause a predetermined degree of turning movement from neutral position in the one or the other direction of said switch, said actuating mechanism comprising a motion transmitting member whose lower end is operatively connected with said switch and whose upper free end carries said cam roller, and an auxiliary yoke member having a pair of shanks supported by said valve body and having a hollowed body portion rigidly interconnecting said shanks through which body portion said threaded rod with the cam nuts may move, said body portion being provided interiorly at one side with a detent and locking portion for said roller having an inwardly extending peak at which said roller is disposed when the switch is in neutral position and having a detent face extending downwardly and outwardly from said peak and adapted to be engaged by said roller when the latter is engaged by said upper cam nut incident to the closing of the valve, said detent portion also having an upwardly and outwardly extending detent face to be engaged by the roller when the latter is engaged by said roller cam nut incident to the opening of the valve.

5. In combination with a valve body having a valve stem, power actuating mechanism for effecting axial opening and closing movements of the stem, and means for supporting said actuating mechanism upon said valve body, electric control mechanism actuated by the stem and comprising a threaded axial extension rod extending from the stem, an upper cam nut adjustable upon said rod, a lower cam nut adjustable upon said rod, a turnable drum switch for effecting the electrical control, a cam roller operable in one direction by said upper cam nut incident to the closing movement of the valve and operable in the opposite direction by said lower cam nut, and a positively actuating connection between said cam roller and said rotary drum switch being effective incident to axial movement of said stem and due to the engagement of said cam roller by said cam nut, to cause a predetermined degree of turning movement from neutral position in the one or the other direction of said switch, said actuating mechanism comprising a motion transmitting member whose lower end is operatively connected with said switch and whose upper free end carries said roller, and an auxiliary yoke member having a pair of shanks supported by said valve body and having a hollow body portion rigidly interconnecting said shanks through which hollow body portion said rod with said cam nuts may move, said body portion being provided interiorly at one side with a detent and locking portion for said roller and having an inwardly extending peak at which said roller is disposed when the switch is in neutral position and having a detent face extending downwardly and outwardly from said peak, and adapted to be engaged by said roller when the latter is engaged by said upper cam nut incident to the closing of the valve, said detent portion also having an upwardly and outwardly extending detent face to be engaged by said roller when the latter is engaged by said lower cam nut incident to the opening of the valve, and a pair of guide rollers one above the other mounted on said hollow body portion of the yoke member and opposite to said detent portion for engaging one or the other of the cam nuts when the same are engaging said roller.

6. In combination with a valve body having a valve stem, power actuating mechanism for effecting axial opening and closing movement of the stem, and means for supporting said actuating mechanism upon said valve body; electric control mechanism actuated by the stem, and comprising an axial threaded extension rod extending from the end of the stem, a cam nut adjustable upon said rod, a turnable drum switch for effecting the electric control, a cam roller cooperatively associated with said cam nut, and a positively actuating crank connection between said cam roller and said switch effective incident to the axial movement of said stem to cause a predetermined degree of turning movement of said switch due to the engagement of said cam roller by said cam nut, means determining a neutral position of said turnable drum switch and comprising resilient means for automatically returning said drum switch to said neutral position as and when the cam nut releases the roller.

7. In combination with a valve body having a valve stem, power actuating mechanism for effecting axial opening and closing movements of the stem, and means for supporting said actuating mechanism upon said valve body; electric control mechanism actuated by the stem and comprising a threaded axial extension rod extending from the stem, an upper cam nut adjustable upon said rod, a lower cam nut adjustable upon said rod, a turnable drum switch for effecting the electric control, a cam roller operable in one direction by said upper cam nut incident to the closing movement of the valve and operable in the opposite direction by said lower cam nut, and a positively actuating connection between said roller and said rotary drum switch being effective incident to axial movement of said stem and due to the engagement of said cam roller by said cam nut to cause a predetermined degree of turning movement from neutral position in the one or the other direction of said switch, means for determining a neutral position of said turnable drum switch and comprising resilient means for returning said drum switch to said neutral position as and when the upper or the lower cam nut respectively releases the roller.

NELSON H. MAGEOCH.
WILLIAM F. PLUME.